Jan. 29, 1963     A. HALE     3,075,238
METHOD AND APPARATUS FOR MILLING RUBBER AND LIKE MATERIAL
Filed Nov. 9, 1960     8 Sheets-Sheet 1

FIG. IA

INVENTOR
ANDREW HALE
BY Bosworth, Sessions,
Herrstrom & Knowles
ATTORNEYS

Jan. 29, 1963  A. HALE  3,075,238
METHOD AND APPARATUS FOR MILLING RUBBER AND LIKE MATERIAL
Filed Nov. 9, 1960  8 Sheets-Sheet 3

INVENTOR
ANDREW HALE
BY Bosworth, Sessions,
Herretrom & Knowles
ATTORNEYS

Jan. 29, 1963     A. HALE     3,075,238
METHOD AND APPARATUS FOR MILLING RUBBER AND LIKE MATERIAL
Filed Nov. 9, 1960     8 Sheets-Sheet 4

INVENTOR
ANDREW HALE
BY Bosworth, Sessions,
Herrstrom & Knowles

ATTORNEYS

Jan. 29, 1963   A. HALE   3,075,238
METHOD AND APPARATUS FOR MILLING RUBBER AND LIKE MATERIAL
Filed Nov. 9, 1960   8 Sheets-Sheet 5

INVENTOR
ANDREW HALE
BY Bosworth, Sessions
Herrstrom & Knowles
ATTORNEYS

FIG. 9

INVENTOR.
ANDREW HALE
BY Bosworth, Sessions
Herrstrom & Knowles
ATTORNEYS

United States Patent Office 3,075,238
Patented Jan. 29, 1963

3,075,238
METHOD AND APPARATUS FOR MILLING RUBBER AND LIKE MATERIAL
Andrew Hale, Akron, Ohio, assignor to Blaw-Knox Company, Pittsburgh, Pa., a corporation of Delaware
Filed Nov. 9, 1960, Ser. No. 68,296
7 Claims. (Cl. 18—2)

The present invention is directed to the working of plastic stock, and more particularly to an improved method and apparatus for working such stock which makes possible the manufacture of superior products with substantial savings in labor, time, plant space, and costs of equipment.

As referred to herein, the term "plastic stock" is intended to mean stocks comprising natural, synthetic or reclaimed rubber, certain types of synthetic resins or other synthetic plastic materials which are mixed and processed similarly to rubber, and mixtures of such material.

In the processing of such stocks, it is highly desirable that the stock be intensively worked to thoroughly disperse compounding ingredients added to the stock, to break down the stock, and to plasticize it. It has been found that for the best results, the stock while being worked should be kept within a temperature range which is quite critical; for example, most rubber stocks should be maintained between approximately 160° and 250° F. while being worked, and most synthetic resins such as polyethylene should be kept within a similar temperature range while being worked. At substantially higher temperatures the stock becomes too soft to work properly because there is little or none of the shearing action which is necessary for proper working, and if the temperatures become considerably higher the stock may be damaged by premature curing or by decomposition. On the other hand, if the stock is worked at lower than the required temperatures, the stock does not become a cohesive mass and does not adhere to the roll surfaces, so that working is not effected.

Intensive working of such stock on a mill, however, tends to cause the stock to become heated because of frictional forces developed on and in the stock. It is the usual practice to cool the mill rolls to attempt to keep the temperature down in the desired range. This is difficult when a bulky non-uniform mass is being worked and when the surface area of the stock exposed to the mill rolls is not uniform, and localized overheating of the stock can result, with resulting degradation of product quality. Product deterioration also often occurs because all of the stock in the bight of the mill rolls is not uniformly intensively worked. This arises when the bank of stock in the bight is so large that only the stock in the part of the bank nearest the rolls is drawn into the mill rolls and worked, and the stock in the part of the bank more remote from the rolls remains unworked and stagnant; in such case, the stock in the part of the bight nearest the rolls usually is relatively overworked, while the remainder of the stock is relatively underworked, so that the product leaving the mill rolls is of non-uniform and off-quality. To avoid these difficulties, a smaller amount of stock must be introduced into the bight of the rolls, but in such case the output of the mill may be reduced to a point where productivity costs are excessive.

The prior means employed in an effort to achieve the desired results is exemplified by consideration of the typical generally used method of preparing rubber stocks, such as those which may be used in the manufacture of extruded or molded articles, or tires. In such a typical method, there is a first mixing of what is known as a "master batch" containing the rubber stock and non-curative compounding ingredients such as carbon black, zinc oxide, softeners, aging ingredients, and the like, such mixing usually being performed in an internal mixer or the like. The stock discharged from the mixer is either pelletized and the resulting pellets are cooled and then delivered to storage, or is delivered to a sheeting mill on which the stock is manually manipulated and thereafter manually cut into slabs which are hung by hand on a cooling conveyor from which they are manually transported to storage. Thereafter, there is prepared a so-called "finish mix" comprising a measured quantity of the stock of the master batch either in the form of pellets or cut sheets, and curative ingredients such as sulphur and accelerators. These materials are usually remixed in an internal mixer and then remilled on a roll mill which forms the stock into sheets which again are manually cut, cooled and stored for a suitable period. When the stock of this finish mix is to be ultimately used, it is again put on another mill for warming while it is manually manipulated, and is then delivered to the extrusion or calendering apparatus which forms it into the ultimate shape.

While the above operations of the method may be varied or modified in minor particulars in accordance with the practices prevailing in various rubber factories, the method is fairly representative and has not been basically modified for many years. It is apparent that it consumes a great deal of time, requires a heavy capital investment, considerable plant space, and much labor in feeding and manipulating the materials on the mills and loading the milled material into suitable containers or onto suitable racks for storage, etc. Furthermore, because of these numerous separate operations and great amount of hand labor required, it is very difficult if not impossible to obtain the addition of proper amounts of stock and compounding ingredients, adequate working of the stock to disperse the ingredients, and the desired uniformity of composition, plasticity, and other properties of the stock. It is also impossible to increase the speed of production with such equipment and operations, because hand operations at higher speeds would be excessively dangerous, and because the above-described tendencies toward product variation would be accentuated.

Figure 4:
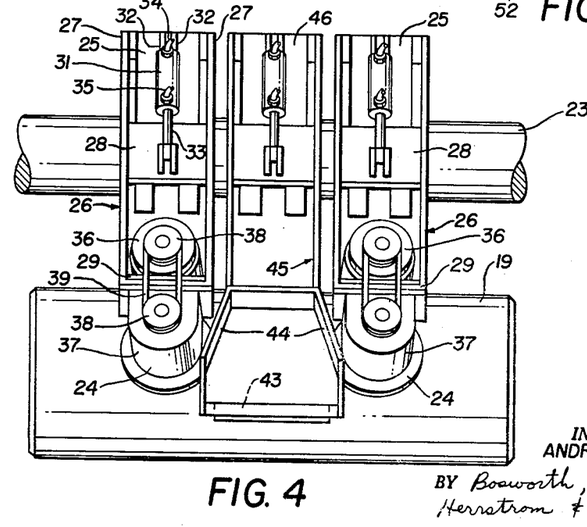
Figure 5:
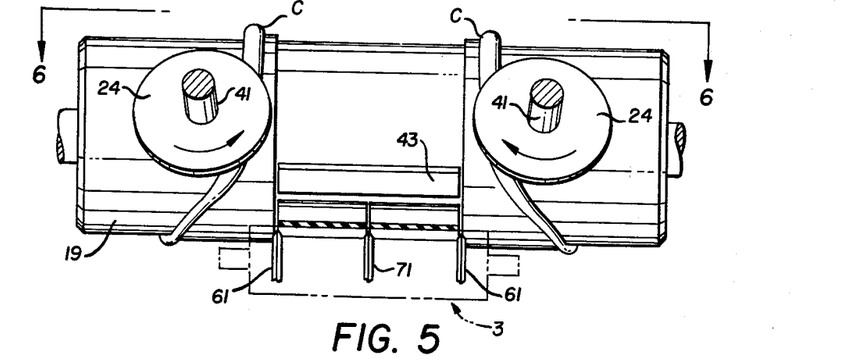

One of the principal objects of the present invention is to provide apparatus and method for processing plastic stocks which require considerably less labor, time, plant space and capital investment than prior apparatus and method. Another object is to provide apparatus and method which will greatly reduce the cost of manufacture of plastic stocks, improve their quality, and increase their speed of production. A further object is the provision of apparatus and method which will consistently result in the production of plastic stocks which are highly uniform in composition and plasticity, and which can be made into extrusions or calendered sheets of highly uniform density and close dimensional tolerances. A further objective is to eliminate the necessity of pelletizing or sheeting the stock of the master batch and then cooling and storing it, and then remixing it in an internal or similar mixer before again remilling it. Another object is to provide apparatus and method by which the stock is uniformly processed continuously and in single operation, to the condition which in conventional practice requires the above-described numerous time and labor consuming discontinuous steps of working a master batch, pelletizing or sheeting the thus worked stock, weighing and mixing the stock into a finish mix, remilling the finish mix, and again storing the stock, together with the numerous attendant steps of handling and transporting the stock. Another object is the provision of apparatus and method whereby the plastic stock is intensively worked on a mill, temporarily removed from the mill in the form of a thin sheet or strip and then returned to the mill for further working, the cycle being repeated as long as desired, the removal of the stock from the mill in the form of a thin FIGURE 4, this member 26 comprises two spaced arm members 27 fixed to and separated by intermediate and bottom cross members 28 and 29. An air cylinder 31 is pivotally connected to lugs 32 fixed to the upper portion of bracket 25, the piston rod 33 of the cylinder being pivotally connected to the intermediate cross member 28 of the pivoted frame 26. The position of the curling roll 24 carried by the frame 26, relatively to the work roll 19, is adjusted by admitting or exhausting air under pressure through conduits 34 and 35 at the ends of the cylinder 31.

The bottom cross member 29 of each frame 26 carries the driving motor 36 and the transmission unit 37 for the curling roll 24 carried by the frame 26. Variable pitch pulleys 38 on the motor and transmission unit, supporting a drive belt 39, complete the drive from the motor to the transmission unit and hence to the curling roll 24 mounted on and driven by the transmission unit; the speed of the curling roll may be varied by adjustment of the pulleys 38 and belt 39.

Figure 3:
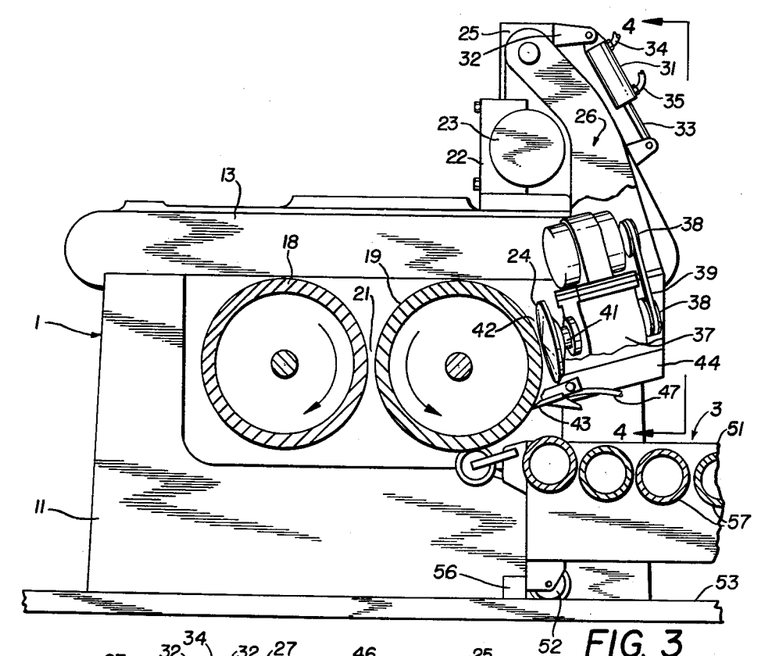
Figure 6:
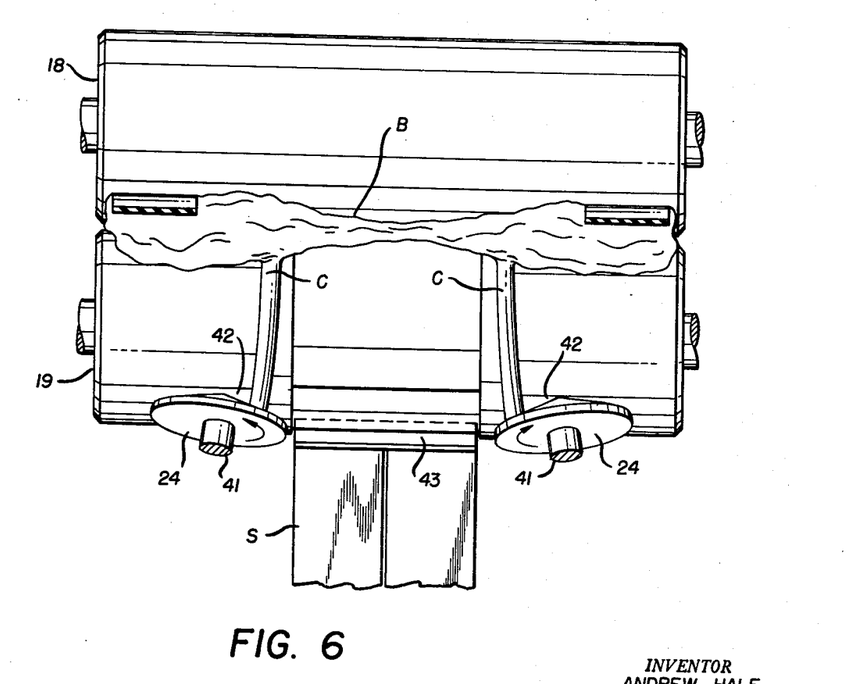

As is shown in FIGURES 3 and 6 and other views, the working face of curling roll 24, i.e. the face adjacent to the work roll 19, is formed as a shallow cone. The angle between the side and the base of the cone may be of various sizes but preferably should be quite small; in actual practice an angle of 3° has been found to work in a highly satisfactory manner. Preferably, the axis of the drive shaft 41 of each curling roll is tilted so that the side of the curling roll nearest the adjacent end of the work roll 19 is substantially parallel to the face of the work roll. Tilting of the axis of the curling roll creates a V-shaped or flaring pocket 42 on the side of the curling roll 24 away from the end of the work roll 19 and opening toward the central peripheral portion of the work roll, as shown in FIGURE 6. A coil of stock will find its position in this pocket during operation of the mill. The relative speed of rotation of the curling roll to the work roll is regulated so that at the point where the coil of stock locates itself the surface speed of the curling roll is about the same or a little greater than the surface speed of the work roll.

In the apparatus of FIGURES 1A to 9, inclusive, there is a take-off blade 43 adapted to have its leading edge disposed in contact with or in close proximity to the portion of the central peripheral portion of the work roll 19 below and between the curling rolls 24. The width of this blade is equal to the width of the two strips of stock S which leave the work roll and pass over the conveyor 2. This blade 43 is shown as mounted on a bracket 44 fixed to a pivotally mounted frame 45 which may be identical to the frame 26 carrying each curling roll 24, and which may be supported by a bracket 46, similar to each bracket 25, which is fixed to transverse member 23 mounted on the frames 11 and 12 of the mill. One or more tubes 47, communicating with an orifice 48, are provided to discharge one or more streams of a liquid release agent beneath the take-off blade 43 and between the blade, roller 19, and stock strips to aid in separating the stock from the work roll 19. Preferably, this liquid release agent is a silicone-water solution, which is discharged in one or more streams at this location for a short time when the take-off blade is initially engaged, to aid the blade in starting its operation of peeling the strip S off the roll 19 and passing it to the conveyor rolls of take-off device 3.

Figure 1A:
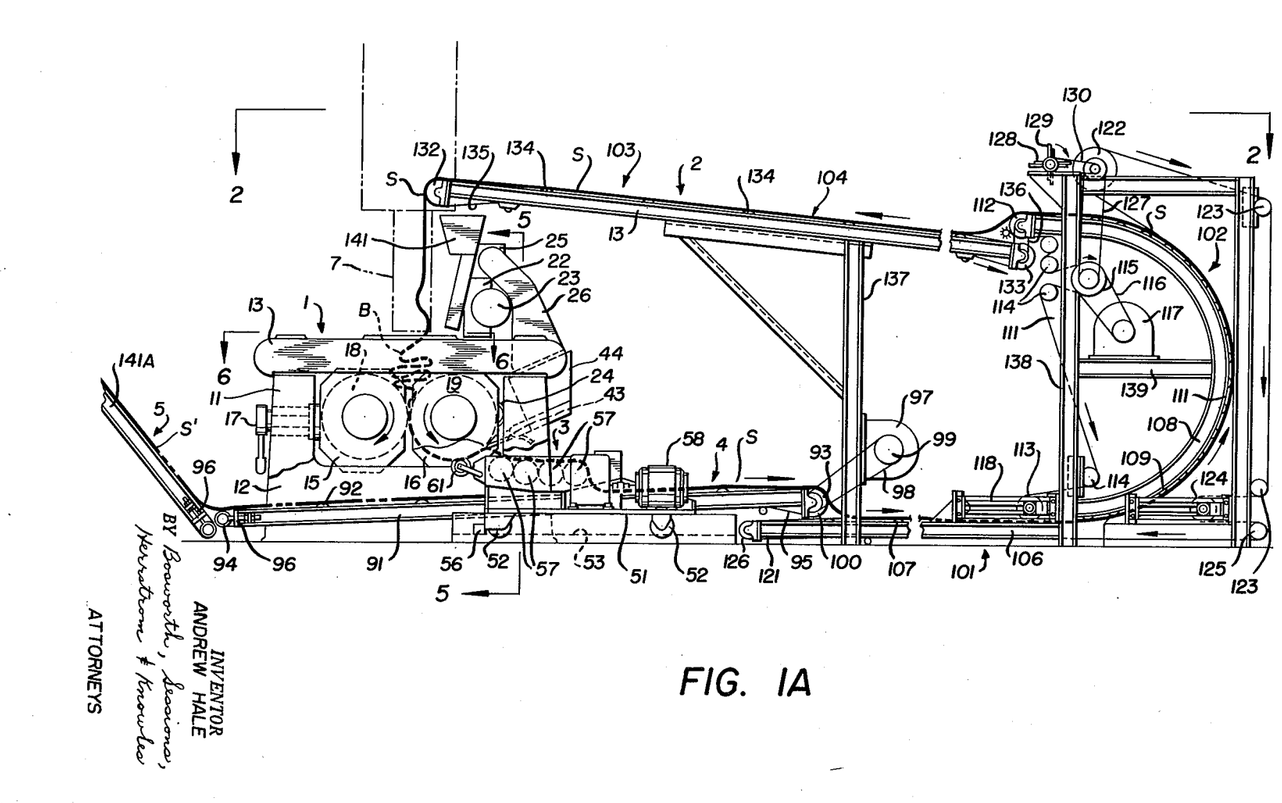
Figures 7, 8:
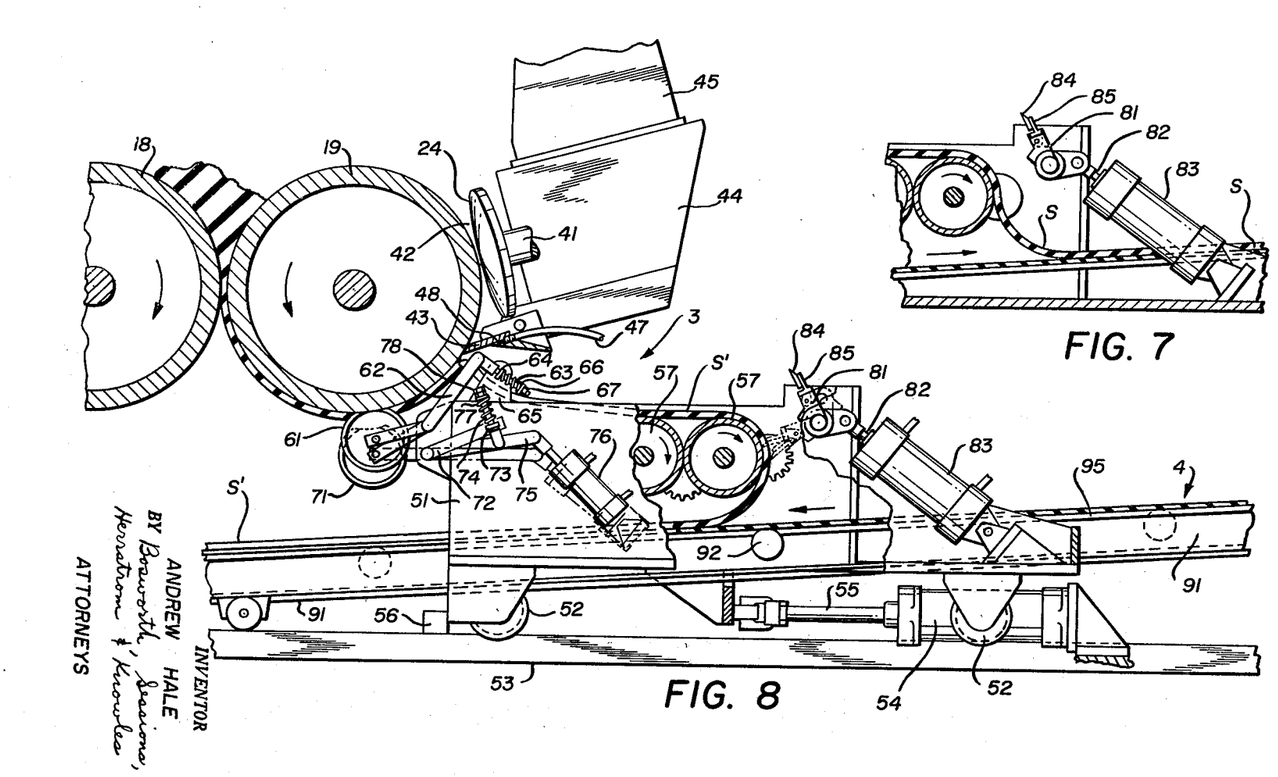

*Take-off device.*—As is shown in FIGURES 1A and 8, the take-off device 3 comprises a carriage 51 mounted on grooved rollers 52 adapted to roll on the floor-supported tracks 53. The carriage 51 is adapted to be moved toward and away from the mill, as required, by a fixed air cylinder 54 the piston rod 55 of which is connected to the carriage. Ordinarily the carriage is maintained in its closest position relatively to the work roll 19 by being held by the air cylinder 54 against a stop member 56, which may be adjustable as shown. The carriage usually is retracted only when it is desired to clean the apparatus, or to repair or adjust parts such as the knives. The carriage 51 supports a plurality of conveyor rolls 57 for rotation about axes generally parallel to that of the work roll 19. These conveyor rolls are adapted to be positively rotated in unison in the direction which will conduct stock away from the work roll 19, by a motor 58 operating through suitable gear means not shown.

The carriage 51 also carries a pair of outer knives 61 mounted so they closely approach the work roll 19 and cut the stock to determine the outer edges of the strip or strips being removed from the work roll. In the illustrated embodiment, the knives are not rotatable and each is mounted to be resiliently urged toward the work roll by being fixed to one end of a bell crank lever member 62 which intermediate its ends is pivotally mounted on the carriage 51 and which at the other end is pivotally connected to a plunger member 63 passing through a lug 64 mounted on a bracket 65 fixed to the carriage 51. The projecting end of plunger member 63 carries an expansion type spring 66 operating between lug 64 and adjusting nuts 67 on plunger 63. The pressure of the spring against the end of plunger 63 which is connected to the knife supporting member 62 tends to urge the knife 61 toward the roll.

Figure 1B:
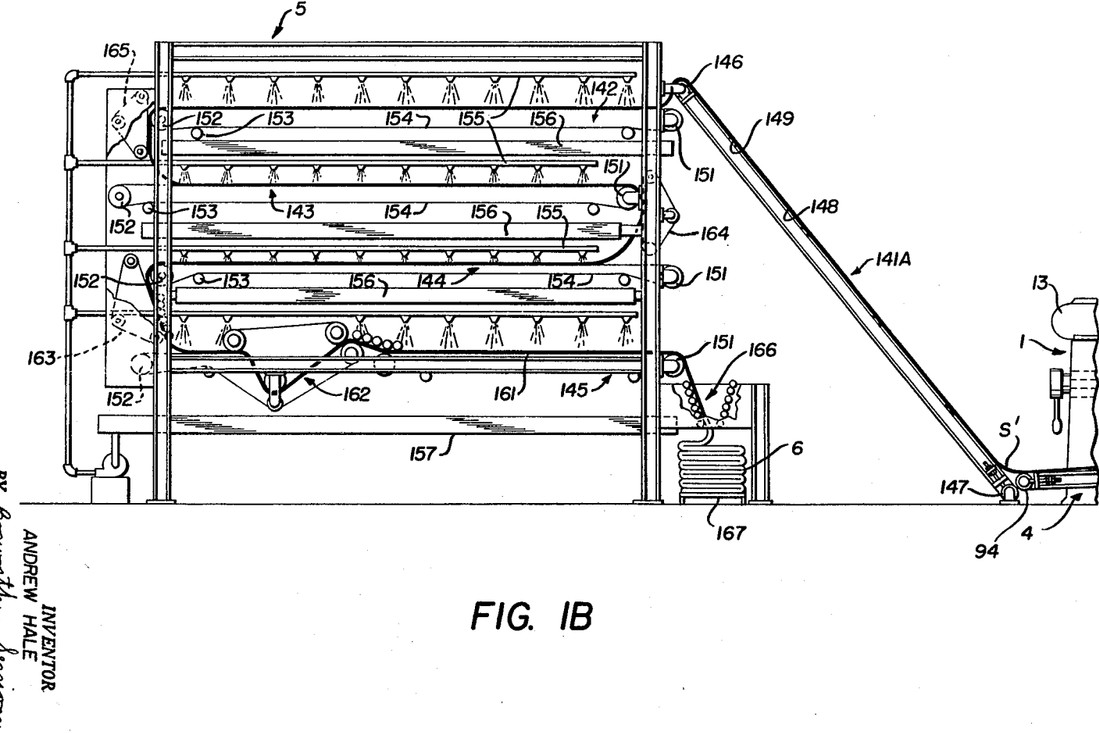
Figure 9:
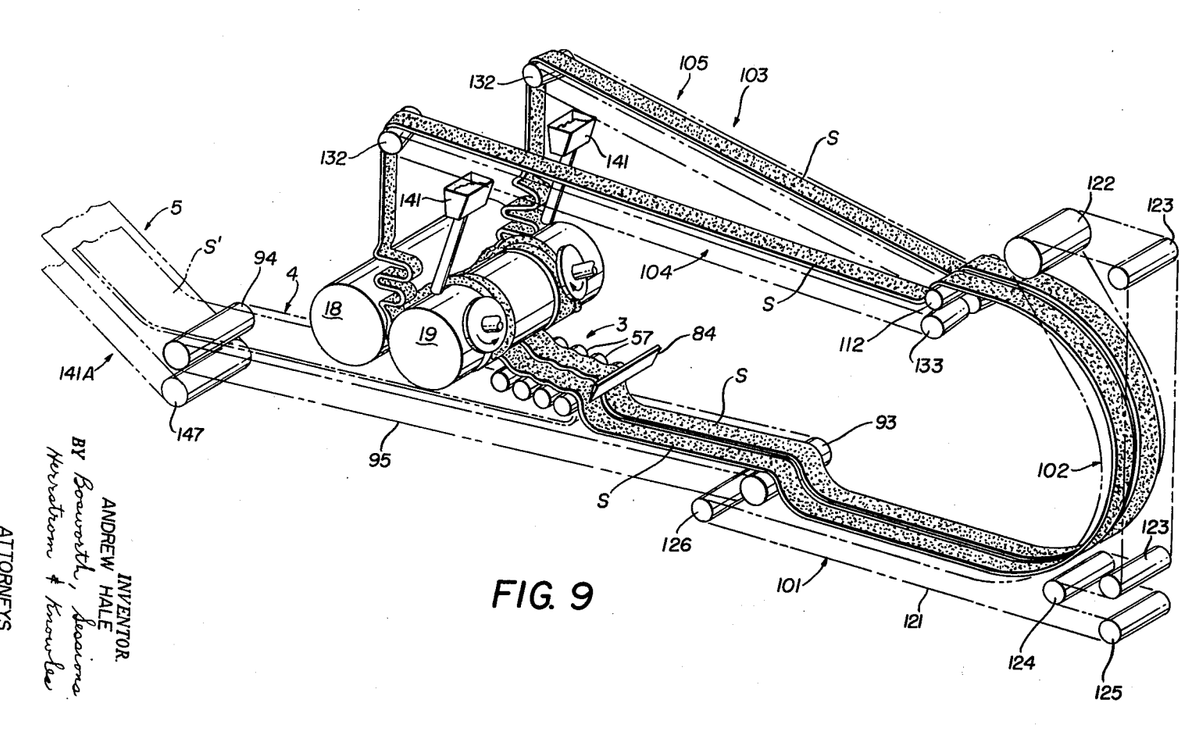

The carriage 51 also carries another knife 71 disposed centrally between the two outer knives 61, and adapted to be brought into close proximity with the work roll 19 to slit the stock to form two strips of stock when the stock is traveling to the conveyor system 2, as is shown in FIGURES 1, 7 and 9. The knife 71 is adapted to be retracted, as shown in FIGURE 8, so that a single wide strip of stock S′ leaves the work roll 19 as it is discharged from the mill rolls by the reversible conveyor 4, as is shown in FIGURE 8. This knife 71 is mounted so it can be thus moved away from the work roll 19, and also be moved into close proximity to such roll and resiliently held in such position by the means shown in FIGURE 8. The knife 71 is fixed to an arm member 72 pivotally mounted on the carriage 51. The end of this arm member has a lug 73 through which passes a plunger member 74 one end of which is pivotally connected to a linkage member 75; one end of member 75 is pivotally connected to carriage member 51 and the other end is pivotally connected to the piston rod of a pivotally mounted air cylinder 76. The projecting end of plunger member 74 is surrounded by an expansion type spring 77 operating between lug 73 of arm member 72 and adjusting nuts 78 on the end of plunger members 74. Consequently, when the piston rod of the air cylinder 76 is at the outer end of its stroke, as is shown in full lines in FIGURE 8, the center knife 71 is retracted from the work roll 19. When the piston rod is at the other end of its stroke, as is shown in dotted lines in FIGURE 8, the center knife is in cutting position in close proximity to the work roll 19, and is resiliently urged toward it by the described linkage and the spring 77.

The carriage 51 also supports means for cutting the strip of material being taken off the work roll 19 and traveling over the conveyor rolls 57 to the reversible conveyor 4 when it is desired to discharge the stock from the apparatus shown in FIGURE 1A. This cutting means comprises a member 81 rotatably carried by carriage 51 for partial rotary movement about an axis parallel to that of work roll 19, and adapted to be so moved when desired by reciprocation of the piston rod 82 of air cylinder 83 pivotally mounted on the carriage 51. Member 81 carries a cutting blade 84 fixed to a bracket 85 rigidly mounted on member 81. The adjacent surfaces of bracket 85 and member 81 are so shaped that when the member 81 is rapidly swung downwardly by the air cylinder 83 in cutting relation, the blade 84 is fully extended as shown in full lines and the upper broken lines in FIGURE 8, and cuts the stock, whereas when the member 81 is retracted toward its uppermost position it is moved by contact with the stock to an angular position in which it cannot cut, as shown by the lower broken lines in FIGURE 8. The which may be power driven to provide a linear belt speed preferably slightly greater than that of the reversible conveyor 4, an endless belt 148 passing over such rollers, and suitable intermediate rollers 149 supporting the belt. This conveyor is inclined to conduct the strip of stock from the lower reversible conveyor 4 to the uppermost cooling conveyor section 142.

Each of cooling conveyor sections 142, 143, and 144 is similar in that it comprises two end rollers 151, 152 either or both of which may be power driven, intermediate belt supporting rollers 153, and an endless belt 154 passing around the rollers. Means 155 is located above the belt to sprinkle cooling liquid such as plain water or a water-soap solution on the strip of stock carried by the belt; a collecting tray or trough 156 is located below each of the sections 142, 143 and 144 to collect the liquid; the liquid is drained from each tray 156 to a sump 157 from which it may be returned to the sprinkler means 155, suitable connecting piping of course being supplied for this purpose.

The last conveyor section 145 may be identical, but preferably comprises a flat belt section 161 preceded by a hugging section 162 of the conveyor to insure that the stock does not slip on the section 161; hugging sections 163, 164 and 165 are also preferably provided at the ends of conveyor sections 142, 143 and 144 to hold the stock strip on the conveyor. These hugging sections are of conventional construction and require no further description.

At the end of conveyor section 145, the stock strip passes into a "wig-wag" conveyor 166 of a known type having a power reciprocated lower end which folds and lays the strip up on the pallet 167. Each pallet may hold one or more complete strips each of which consists of the stock of an entire batch fed to the mill 1.

The stock on the pallets 167 may be moved into storage until needed for use, or may be immediately processed for molding, as by being milled and extruded prior to molding as in conventional practice.

Figure 2:
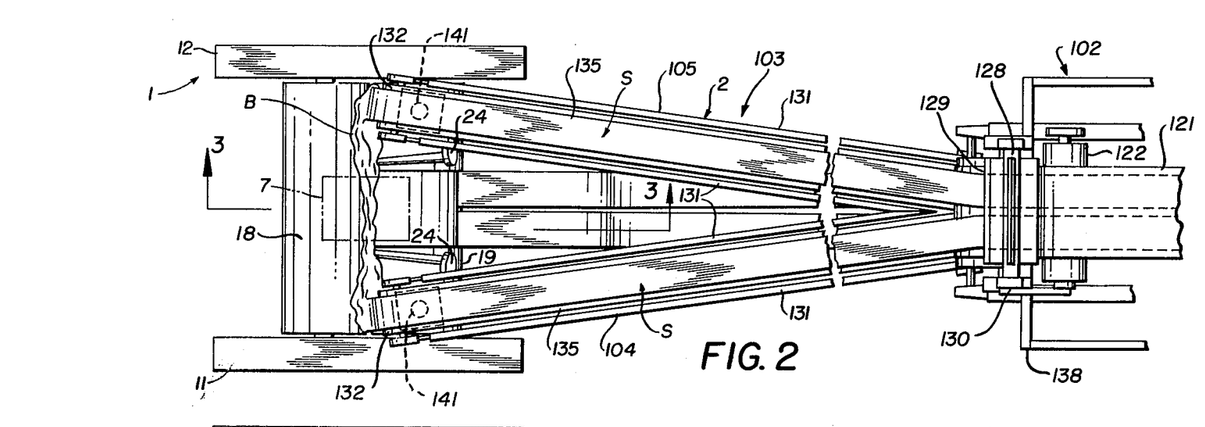
Figure 10:
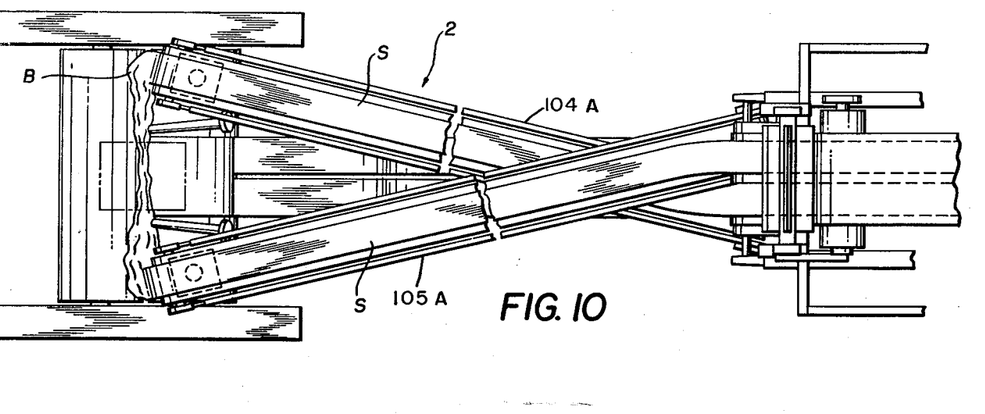
Figure 11:
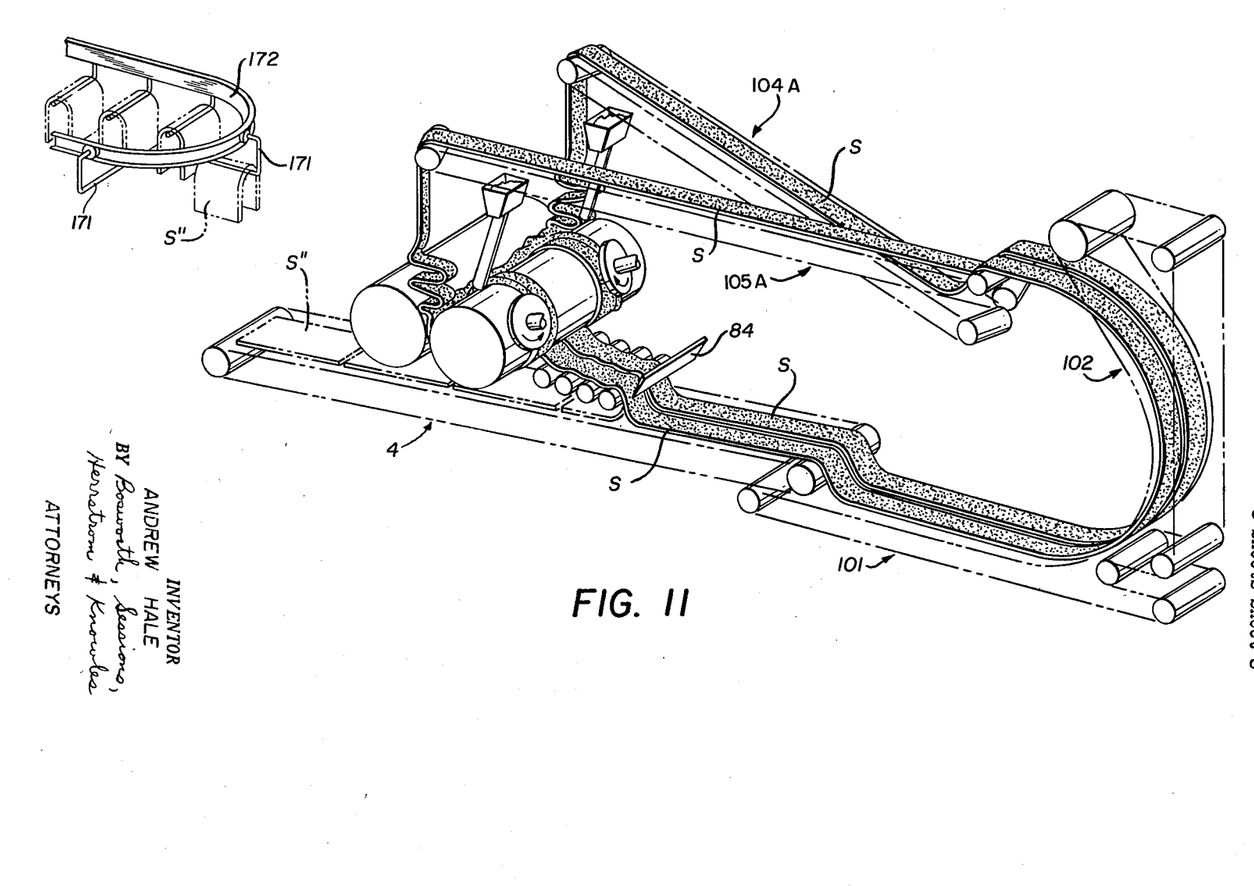

Alternatively, the stock discharged from the portions of the apparatus shown in FIGURES 1A, 2, and 9, or in modified form in FIGURES 10 and 11, may be handled otherwise. For example, as shown in FIGURES 10 and 11, the stock may be discharged onto the reversible conveyor 4 in the form of short strip lengths or slabs S". These short lengths or slabs may be manually or automatically picked off conveyor 4 and hung on the hooks 171 of a conventional hook type conveyor 172 on which they are cooled, and then piled on pallets for storage and subsequent use.

*Operation.*—The apparatus illustrated in FIGURES 1A to 9, inclusive, is preferably operated as follows: The carriage 51 is located in its closest position to the work roll 19, being urged against stop member 56 by air cylinder 54. The two outer knives 61 are located in their closest position to work roll 19 so that they are in cutting relation to stock on such roll. The center knife 71 can be either advanced into cutting relation adjacent the work roll, or can be in its retracted position. A batch of stock to be worked is discharged into the bight of the mill rolls 18 and 19 from the chute 5 of a "Banbury" mixer in which the stock has been given a preliminary mixing and compounding with noncurative ingredients. The mill rolls are rotated in the direction indicated by the arrows in FIGURES 1A and 8, and the curling rolls are rotated at a speed indicated above, in the directions indicated in FIGURES 5, 6 and 9.

Rotation of the mill rolls causes the stock to spread longitudinally thereof in the bight, and also causes the stock to pass between the mill rolls in the form of a sheet which clings to the work roll 19. When the sheet of stock reaches each of the curling rolls 24 it first contacts a side of the curling roll which is substantially parallel to the work roll 19. Each curling roll then acts to roll the stock upon itself from such side toward the pocket 42 formed by the surface of the work roll 19 and the portion of the conical surface of the curling roll which is nearest the central portion of and inclined to the work roll. As soon as one or two convolutions of stock have been formed, a partially formed coil of stock will progress across the curling roll and locate itself in such pocket 42, where a final coil C (FIGURES 5 and 6) will stay during the entire remainder of the mill operation. As each coil of stock is carried around the work roll after leaving the curling roll, it is returned and introduced endwise into the bank B of stock in the bight of the mill rolls, which it joins, to be subsequently remilled. The stock behaves in the manner described because the near side of the curling roll, i.e., the portion which is substantially parallel to the surface of the work roll, is close enough to the work roll to contact and pick up the stock and because its surface moves in a direction opposite to that of the work roll, as is shown by the arrows in several views. These oppositely moving surfaces of the work roll and the curling roll curl the edge of the stock and then deliver the partially curled edge to the pocket 42 on the far side of the curling roll. To facilitate this action, the near face of each curling roll and the face of the work roll should be spaced by a distance substantially less than the thickness of the stock on the work roll, which latter is determined by the spacing at the bight. It is necessary to insure that the curling roll does not rub against the work roll and that there is sufficient pressure exerted on the stock to cause it to form into the initial coil. The curling operation is started at each curling roll 24 and proceeds automatically as described without the attention on the part of the operator. Each curling roll advances the stock away from the pocket 42 and from the curling roll toward the central peripheral portion of the work roll.

Preferably, after the stock has thus been thoroughly distributed in sheet form over the lower portion of the work roll 19, the center knife 71 is moved into cutting position if it had not previously been so moved, and the take-off blade 43 is moved adjacent work roll 19 into take-off position. One or more streams of a liquid release agent, such as a silicone-water fluid, are sprayed from the orifice 48 and tube 47 at the juncture of the stock within the blade 43 and roll 19, to aid in initiating removal of the stock. Two strips S of stock are then formed and removed from the work rolls 19, being moved away from the work roll by the conveyor rolls 57 of the take-off device 3. The strips then pass onto the reversible conveyor 4 which is driven in the direction to carry the strips toward the conveyor system 2, then onto the belt 121 of the bottom conveyor section 101, and thereafter between the belt 121 and the belt 111 moving through the curved section 102 of the conveyor system 2. After leaving the top of the curved section, each strip passes to one of the divergent top sections 104 and 105 of the conveyor system; the belt 135 of each such top section carries the strip on it to one of the ends of the bight between the mill rolls, as is shown to advantage in FIGURES 1, 2, 6 and 9. Even when the strips are starting their travels over the conveyors, they start themselves without the necessity of manually threading or starting the strips on the conveyors.

The stock preferably is caused to pass repeatedly through the cycle of milling and travel over the conveyor system in two continuous, coherent strips; the number of cycles depends on the nature of the stock and the degree of working desired. Preferably, during this operation, additional compounding ingredients such as curing agents, are added to the stock being worked from the hoppers 141. Furthermore, it has been found most beneficial to introduce the compounding ingredients as early as possible in the operation, usually after the stock has completed one complete cycle, so that the ingredients can be thoroughly worked into the stock in the repeated subsequent cycles.

As is apparent, the stock is intensively worked on the mill 1 by the action of the mill rolls 18 and 19 and the curling rolls 24. Such working tends to heat the stock, while positively advancing it to the central peripheral portion of one of said rolls from peripheral portions of said roll on each side of said central portion, removing the stock from said mill rolls in a plurality of continuous coherent strips, conveying said stock in said strips away from said rolls in a pair of separate circuitous paths the length of each of which permits substantial cooling of the stock traveling in said path sufficient to maintain the stock below degradation temperature, returning the stock from said paths to said side portions of said roll and uniting and reworking the stock returning to said rolls in said paths.

2. The method of processing plastic stock comprising the steps of working stock on a pair of rotating mill rolls while positively advancing it toward the central peripheral portion of one of said rolls from peripheral portions of said roll on each side of said central portion, removing stock from said rolls in a plurality of continuous coherent strips, conveying said stock in said strips away from said rolls in a pair of separate circuitous crossing paths, the length of each of which permits substantial cooling of the stock traveling in said path sufficient to maintain the stock below degradation temperature, returning the stock from each path to the side portion of said roll opposite the side of said central portion at which said stock left said rolls, and uniting and reworking the stock returning to said rolls in said paths.

3. The method of processing plastic stock comprising the steps of working stock on a pair of rotating mill rolls while positively advancing it toward the central peripheral portion of one of said rolls from peripheral portions of said roll on each side of said central portion, removing the stock from said mill rolls in a plurality of continuous coherent strips, conveying said stock in said strips away from said rolls in a pair of separate circuitous paths the length of each of which permits substantial cooling of the stock traveling in said path sufficient to maintain the stock below degradation temperature, returning the stock from said paths to said side portions of said roll, uniting and reworking the stock returning to said rolls in said paths, and adding compounding material to the stock passing to said rolls.

4. The method of processing plastic stock comprising repeatedly performing the steps of working a batch of stock on a pair of rotating mill rolls while positively advancing it to the central peripheral portions of one of said rolls from peripheral portions of said roll on each side of said central portion, removing the stock from said mill rolls in a plurality of continuous coherent strips, conveying said stock in said strips away from said rolls in a pair of separate circuitous paths the length of each of which permits substantial cooling of the stock traveling in said path sufficient to maintain the stock below degradation temperature, returning the stock in said paths to said side portions of said roll, uniting and reworking the stock returning to said rolls in said paths, thereafter removing the stock from said mill rolls in the form of a discontinuous strip, and temporarily storing said strip while cooling it while a succeeding batch of stock is being worked on said mill.

5. Apparatus for working plastic stock comprising the combination of a mill having two rotatable mill rolls disposed in side by side relation with their axes substantially horizontal and providing a bight between the upper portions of said mill roll mills in which is worked stock introduced therein; curling rolls adjacent one of said mill rolls adapted to coil and advance stock on said mill roll away from each end of said roll and toward the central peripheral portion thereof; a reversible conveyor disposed below said mill rolls and operable to conduct stock away from said mill rolls in either direction; knives positioned below said curling rolls for subdividing the stock on said mill roll, means for removing a strip of stock from said mill roll; means for conducting a strip of stock away from said mill roll and to said reversible conveyor regardless of the direction of movement of said conveyor; means for cutting said strip of stock when required; and power driven conveyor means adapted to receive a strip from said reversible conveyor when it is moving in one of its two directions of movement and to transport said strip away from said mill rolls and back to the bight of said mill rolls through a distance sufficient to permit sufficient cooling of the strip to prevent damage to the stock from heat generated from working of the stock on the rolls.

6. Apparatus for working plastic stock comprising the combination of a mill having two rotatable mill rolls disposed in generally parallel relation with their axes substantially horizontal and providing a bight between said mill rolls in which stock to be worked is introduced; two spaced curling rolls located adjacent one side of one of said mill rolls on opposite sides of the central peripheral portion of said mill roll, said curling rolls being rotated in opposite directions and disposed to coil and positively advance on said mill roll stock, originating in said bight of said mill rolls, away from each end of said mill roll and toward the central peripheral portion of said mill roll; knives adjacent said mill roll for cutting a plurality of strips of stock from the central portion of the stock on said mill roll which has been so advanced to the central peripheral portion of said mill roll; means for removing only said cut strips of stock from said mill rolls; and means for returning the stock in said cut strips to both end portions of the bight between said mill rolls.

7. Apparatus for working plastic stock comprising the combination of a mill having two rotatable mill rolls disposed in generally parallel relation with their axes substantially horizontal and providing a bight between said mill rolls in which stock to be worked is introduced; two spaced curling rolls located adjacent one side of one of said mill rolls on opposite sides of the central peripheral portion of said mill roll, said curling rolls being rotated in opposite directions and disposed to coil and positively advance on said mill roll stock, originating in said bight of said mill rolls, away from each end of said mill roll and toward the central peripheral portion of said mill roll; knives adjacent said mill roll for cutting a plurality of strips of stock from the central portion of the stock on said mill roll which has been so advanced to the central peripheral portion of said mill roll; means for removing only said cut strips of stock from said mill rolls; and means for returning the stock in each of said cut strips to the end portion of the bight which is opposite the end of the mill rolls from which said stock was advanced to said central portion of said mill roll associated with the curling rolls.

References Cited in the file of this patent

UNITED STATES PATENTS

| | | |
|---|---|---|
| 1,364,183 | Dietrich | Jan. 4, 1921 |
| 1,380,632 | Bowden | June 7, 1921 |
| 1,876,309 | MacMonagle | Sept. 6, 1932 |
| 1,930,736 | Burrell | Oct. 17, 1933 |
| 1,963,503 | Quinton | June 19, 1934 |
| 2,011,685 | Maynard | Aug. 20, 1935 |
| 2,540,195 | Engler | Feb. 6, 1951 |
| 2,730,755 | Hale et al. | Jan. 17, 1956 |
| 2,954,580 | Hale et al. | Oct. 4, 1960 |
| 2,968,832 | Hale et al. | Jan. 24, 1961 |